United States Patent
Hans et al.

(10) Patent No.: US 10,671,407 B2
(45) Date of Patent: Jun. 2, 2020

(54) SUSPENDING AND RESUMING A CARD COMPUTING DEVICE

(71) Applicant: Oracle International Corporation, Redwood Shores, CA (US)

(72) Inventors: Sebastian Jürgen Hans, Berlin (DE); Vlad Victor Petrovici, Chitila (RO); Andrei Gabriel Serban, Bucharest (RO)

(73) Assignee: Oracle International Corporation, Redwood Shores, CA (US)

( * ) Notice: Subject to any disclaimer, the term of this patent is extended or adjusted under 35 U.S.C. 154(b) by 148 days.

(21) Appl. No.: 16/002,936

(22) Filed: Jun. 7, 2018

(65) Prior Publication Data

US 2019/0377585 A1 Dec. 12, 2019

(51) Int. Cl.
*G06F 9/44* (2018.01)
*G06F 9/4401* (2018.01)
(Continued)

(52) U.S. Cl.
CPC .......... *G06F 9/4418* (2013.01); *G06F 1/3287* (2013.01); *G06K 19/0712* (2013.01); *G06K 19/0719* (2013.01); *G06K 19/07345* (2013.01)

(58) Field of Classification Search
CPC .................... G06F 9/4418; G06K 19/0719
See application file for complete search history.

(56) References Cited

U.S. PATENT DOCUMENTS 6,912,596 B2   6/2005   Skidmore et al.
8,346,306 B2   1/2013   Kawakishi et al.
(Continued)

FOREIGN PATENT DOCUMENTS

EP   0749063 A2   5/1996
EP   1155365 A1   11/2001
(Continued)

OTHER PUBLICATIONS

SCPTEC(16)000111r5, Change Request, ETSI TC SCP TEC Meeting #65, Sophia Antipolis, France, Nov. 7-10, 2016.
(Continued)

*Primary Examiner* — Albert Wang
(74) *Attorney, Agent, or Firm* — Invoke

(57) ABSTRACT

Suspending and resuming a card runtime environment for a card computing device are disclosed. A card computing device obtains a suspension request. The suspension request includes a proposed value for a minimum suspension interval and/or a proposed value for a maximum suspension interval. The suspension request is accepted or rejected, by the card computing device, based on the proposed value for the minimum suspension interval and/or the proposed value for the maximum suspension interval. The card computing device may negotiate a different value for the maximum suspension interval. Additionally, a card computing device obtains a resumption request. The resumption request includes a resume token. The card computing device determines whether the resume token in the resumption request is valid. The card computing device determines whether the suspension interval is valid. The card computing device resumes the state that was associated with the card computing device at the time of suspension.

20 Claims, 8 Drawing Sheets

(51) Int. Cl.
*G06F 1/3287* (2019.01)
*G06K 19/07* (2006.01)
*G06K 19/073* (2006.01)

(56) References Cited

U.S. PATENT DOCUMENTS

| | | |
|---|---|---|
| 9,004,349 B2 | 4/2015 | Takashi et al. |
| 9,152,205 B2 | 10/2015 | Falik et al. |
| 2012/0083315 A1* | 4/2012 | Kawakishi .............. H04W 4/60 |
| | | 455/558 |
| 2013/0262898 A1 | 10/2013 | Preston et al. |
| 2019/0261270 A1* | 8/2019 | Wu ...................... H04B 1/3816 |

FOREIGN PATENT DOCUMENTS

| | | |
|---|---|---|
| WO | 00/43875 A1 | 7/2000 |
| WO | 20171105711 A1 | 6/2017 |
| WO | 2017/170121 A1 | 10/2017 |

OTHER PUBLICATIONS

SCPTEC(16)000072r6, Change Request, ETSI TC SCP TEC Meeting #65, Sophia Antipolis, France, Nov. 7-10, 2016.
Schlienz and Raddino, Narrowband Internet of Things, 42 pages.
Reset Suspend and Resume Commands, Microchip Technology Inc, 2017.
ETSI TS 102 600 v10.0.0, Smart Cards; UICC-Terminal interface; Characteristics of the USB interface (Release 10), Oct. 2010, 26 pages.
Chapter 5—Starting the Java Card Runtime Environment, Development Kit User's Guide, May 2009, 3 pages.
Chapter 3—Java Card Technology Overview, 20 pages.

\* cited by examiner

SUSPENDING AND RESUMING A CARD COMPUTING DEVICE

BACKGROUND

A card computing device is a device that is embedded with a microprocessor and a memory chip. Card computing devices are used for a variety of applications, including many applications that require cryptography. Card computing devices may be used for, for example, holding money (or money equivalents) and completing financial transactions; providing secure access to a network (such as a mobile network, or a telecommunications service); securing cellular phones or television set-top boxes from fraud or intrusion; and processing data in an Internet of Things (IoT) system.

Applications (also referred as "applets") may execute on a card computing device via a card runtime environment, such as a Java Card Runtime Environment (JCRE). The card runtime environment may provide for interoperability between applets and card computing devices, independent of card vendor and underlying hardware. The card runtime environment may enable multiple applets to execute simultaneously on a single card computing device. The card runtime environment may ensure that communications with a card computing device are compliant with various industry standards, such as the International Organization for Standardization (ISO)/International Electrotechnical Commission (IEC) 7816 standard, or mobile communication standards by the European Telecommunications Standards Institute (ETSI)/Third Generation Partnership Project (3GPP).

Applets may be written as a set of source code, which conforms to a specification directed to the convenience of the programmer. A compiler converts the set of source code into a set of virtual machine instructions, such as Java bytecode. A card virtual machine within a card runtime environment executes the set of virtual machine instructions. The card virtual machine may be, for example, a Java Card Virtual Machine. The set of virtual machine instructions is an intermediate representation of the applet that is between the source code and a set of machine code or object code. Often, functionality that is presented in simple terms via source code by the programmer is converted into more complex steps that map more directly to the instruction set supported by the underlying hardware on which the virtual machine resides.

A card computing device may have limited power supply. Power may be conserved by powering off a card computing device when the card computing device is not in use. However, powering off a card computing device may delete a state of the card computing device. The next time the card computing device is powered on, the card computing device has lost the state from the previous operation of the card computing device. The card computing device needs to repeat previously performed operations, such as initializing the card computing device and/or applets thereon, and authenticating the card computing device and/or applets thereon. As such, powering off and on a card computing device may be an inefficient way for conserving power of the card computing device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. COMPUTING ARCHITECTURE OVERVIEW
3. CARD COMMUNICATION MESSAGES
4. LIFECYCLE OF AN APPLET AND LOGICAL CHANNELS
5. POWERING OFF
6. CARD SUSPENSION AND RESUMPTION SYSTEM
7. PROCESSING A SUSPENSION REQUEST FOR A CARD COMPUTING DEVICE
8. PROCESSING A RESUMPTION REQUEST FOR A CARD COMPUTING DEVICE
9. MISCELLANEOUS; EXTENSIONS
10. HARDWARE OVERVIEW

1. General Overview

Some embodiments include suspending a card computing device. Applets on the card computing device are configured to process requests for suspension. The applets may accept or reject a suspension request based on whether a current state of the card computing device may be transitioned to a suspended state. The applets may also accept or reject a suspension request based on a proposed minimum suspension interval and/or a proposed maximum suspension interval in the suspension request. Suspending a card computing device involves (a) storing a current state, and a resume token in non-volatile memory and (b) removing power from the card computing device.

Some embodiments include resuming a card computing device from a suspended state. Resuming a card computing device includes restoring the state of the card computing device stored at the time of suspension. The card computing device is resumed if (a) a resume token received from a requesting terminal matches a stored resume token for the card computing device and (b) the duration of time that has passed since suspension is within a valid suspension interval.

One or more embodiments described in this Specification and/or recited in the claims may not be included in this General Overview section.

2. Computing Architecture Overview

Figure 1:
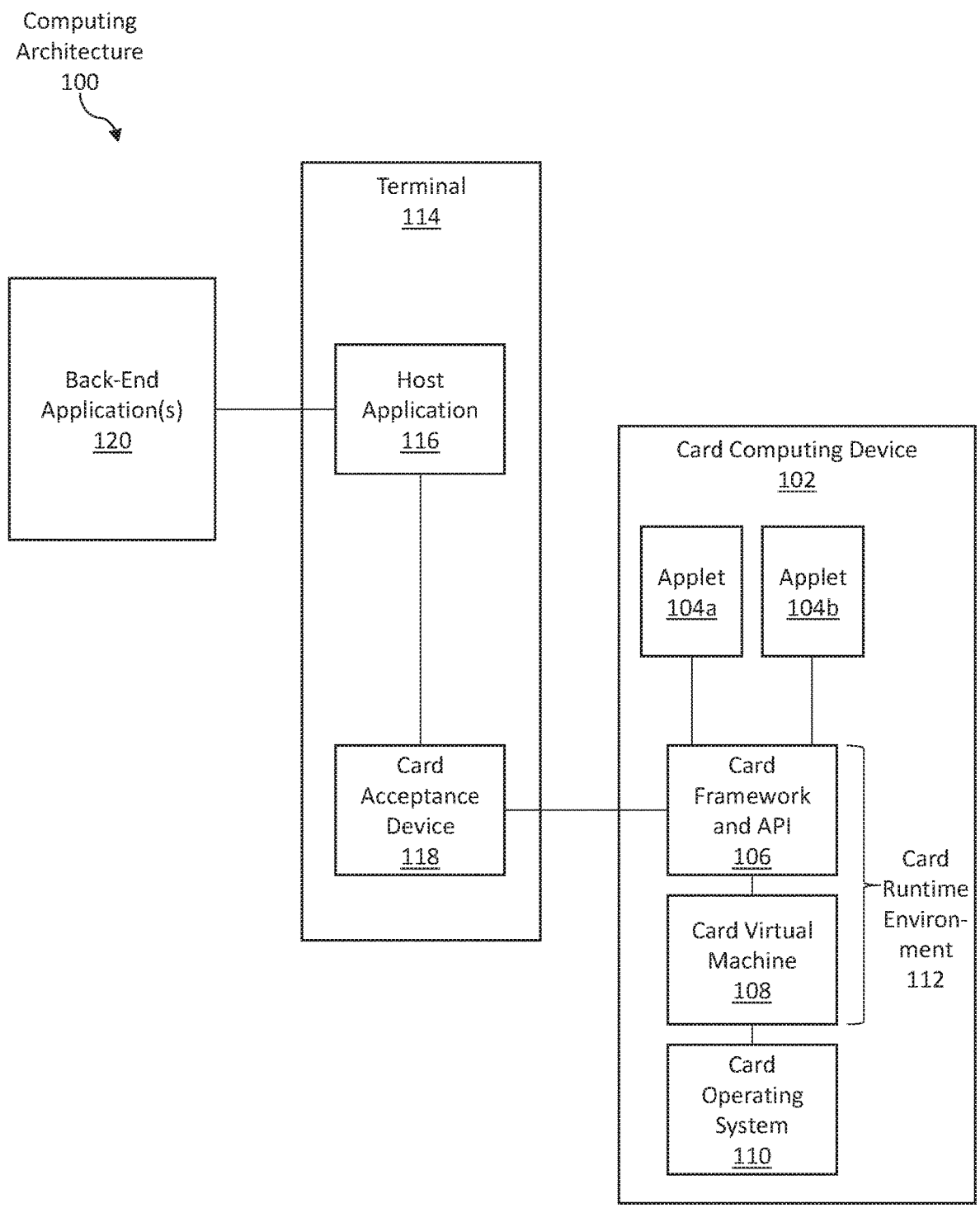
FIG. 1 illustrates an example computing architecture in which techniques described herein may be practiced, in accordance with one or more embodiments.

FIG. 1 illustrates an example computing architecture in which techniques described herein may be practiced, in accordance with one or more embodiments. Software and/or hardware components described with relation to the example architecture may be omitted or associated with a different set of functionality than described herein. Software and/or hardware components, not described herein, may be used within an environment in accordance with one or more embodiments. Accordingly, unless explicitly recited by the claims, the example architecture should not be constructed as limiting the scope of any of the claims.

As illustrated in FIG. 1, a computing architecture 100 includes a card computing device 102, a terminal 114, and one or more back-end applications 120.

In one or more embodiments, a card computing device 102 is a device that is embedded with a microprocessor and a memory chip. As an example, a card computing device may be a subscriber identity module (SIM) card, or a smart card. A card computing device 102 includes a card operating system (OS) 110, a card virtual machine (VM) 108, a card framework and application programming interface (API) 106, and one or more applets 104a-b. A card VM 108 and a card framework and API 106 may be collectively referred to as a "card runtime environment 112."

In one or more embodiments, an applet (such as any of applets 104a-b) is an application executing (or to be executed) on a card VM 108. As an example, an applet may include code for authenticating a card computing device to a back-end application. As another example, an applet may include code for encrypting and decrypting communications between a card computing device and a back-end application. As another example, an applet may include code for authenticating a card computing device to a telecommunications service such that the card computing device may perform communications via the telecommunications service.

An applet may be written as a set of source code using a particular programming language, such as Java, C, C++, C #, Ruby, and Perl. Thus, the source code adheres to a particular set of syntactic and/or semantic rules for the associated language. For example, source code written in Java adheres to the Java Language Specification. However, since specifications are updated and revised over time, a set of source code may be associated with a version number indicating the revision of the specification to which the set of source code adhere. The exact programming language used to write the set of source code for an applet is generally not critical.

A compiler converts the set of source code into a set of virtual machine instructions, which is in a format expected by a card VM 108. The set of virtual machine instructions may be stored in one or more "class files." For example, for a Java Card Virtual Machine, the Java Card Virtual Machine Specification defines a particular class file format to which the class files are expected to adhere.

In some embodiments, each class file corresponds to a "class." A class may be defined in the set of source code. Additionally or alternatively, a class may be dynamically generated by the compiler and/or a card VM 108. In other embodiments, class files may be organized differently. The techniques described herein may be performed regardless of the exact format of the class files. In some embodiments, class files are divided into one or more "libraries" and/or "packages," each of which includes a collection of classes that provide related functionality. For example, a library may include class files that implement input/output (I/O) operations. Another library may include class files that implement mathematics tools. Another library may include class files that implement cryptographic techniques. Another library may include class files that implement graphics utilities. In some embodiments, some classes (and/or fields and methods within classes) may include access restrictions that limit their use to within a particular class, library, and/or package, or to classes with appropriate permissions.

In one or more embodiments, a card framework and API 106 includes a set of core classes, libraries, and/or packages for a card VM 108. Based on the core classes, libraries, and/or packages, a card framework and API 106 transmits and/or receives a card communication message to and/or from a card acceptance device 118. Further, based on the core classes, libraries, and/or packages, a card framework and API 106 invokes a method of an applet to forward and/or pass a card communication message to the applet. A card framework and API 106 receives a response to an invoked method from an applet.

A card framework and API 106 includes, for example, a class for performing system input and output; an interface for identifying methods (and/or associated interfaces) that can be invoked from a host application 116 via a card acceptance device 118; a class that defines a format of a card communication message exchanged between a card computing device 102 and a terminal 114; an abstract class that defines a generic applet (for example, each of applets 104a-b may extend the abstract class); and/or a class that includes methods to control applet execution, resource management, atomic transaction management, object deletion mechanism, and inter-applet object sharing in a card runtime environment.

In one or more embodiments, a card VM 108 is a VM executing (or to be executed) on a card OS 110. A card VM 108 includes an interpreter and/or a compiler (or a component implementing aspects of both). A card VM interprets virtual machine instructions via an interpreter. As an example, a card VM may parse code associated with an applet and directly perform behavior according to the code. As another example, a card VM may translate code associated with an applet into a machine-level representation and execute the translated representation. As another example, a card VM may precompile code associated with an applet, and execute the precompiled code.

In one or more embodiments, a card OS 110 is an OS and/or firmware executing (or to be executed) directly on a card computing device 102. Different types of card operating systems 110 may execute on different card computing devices 102, depending on different vendors of the card computing devices 102.

In one or more embodiments, a back-end application 120 provides one or more services that support one or more applets 104a-b executing on a card computing device 102. As an example, a back-end application may provide connectivity to security systems that, together with in-card credentials, provide strong security. In an electronic payment system, for example, a back-end application may provide access to credit card and other payment information. In a telecommunications system, for example, a back-end application may provide access to telecommunications services for a card computing device. In a temperature monitoring system, for example, a back-end application may provide access to a database for storing and/or analyzing temperatures of components of a target system (such as a datacenter, or a factory).

In one or more embodiments, a terminal 114 refers to hardware and/or software configured to manage and/or facilitate communications among one or more users, one or more applets 104a-b, and/or one or more back-end applications 120. A terminal 114 includes a host application 116 and a card acceptance device 118.

In one or more embodiments, a host application 116 manages and/or facilitates communications among one or more users, one or more applets 104a-b, and/or one or more back-end applications 120. A host application 116 transmits and/or receives a card communication message to and/or from a card acceptance device 118. A host application 116 may be executed on one or more devices, such as a desktop computer, a laptop computer, a tablet, a cellphone, and/or an electronic payment terminal.

In one or more embodiments, a card acceptance device (CAD) 118 is an interface device between a host application 116 and a card computing device 102. A CAD 118 may refer to a contacted interface or a contactless interface.

A CAD 118 provides power to the card computing device 102. A card computing device 102 loses power when the card computing device 102 is withdrawn from a CAD 118.

A CAD 118 performs electrical or radio frequency (RF) communications with a card computing device 102. A CAD 118 forwards a card communication message from a host application 116 to a card framework and API 106 of a card computing device 102. Additionally or alternatively, a CAD 118 forwards a card communication message from a card framework and API 106 of a card computing device 102 to a host application 116.

A "card session" is a period of time during which a card computing device 102 is powered up and/or exchanging card communication messages with a CAD 118.

In some embodiments, a same device executes both a host application 116 and a CAD 118. As an example, an electronic payment terminal at a restaurant or a gas station may include both a host application and a CAD. As another example, a cellphone may include both a host application and a CAD. As another example, a temperature monitoring device may include both a host application and a CAD. In some embodiments, a device may execute a host application 116, and another device may execute a CAD 118. The devices may be coupled to each other through wired or wireless communications channels. As an example, a desktop computer may execute a host application. A card reader may implement a CAD. The card reader may be coupled to the desktop computer using a serial port.

2. Card Communication Messages

In one or more embodiments, a card communication message refers to a message exchanged, via a CAD 118, between a card framework and API 106 and a host application 116. A card communication message may also be referred to as an Application Protocol Data Unit (APDU). A format of a card communication message may adhere to one or more industry standards. A card communication message may include a command, a response to a command, and/or any other content.

Figure 2A:
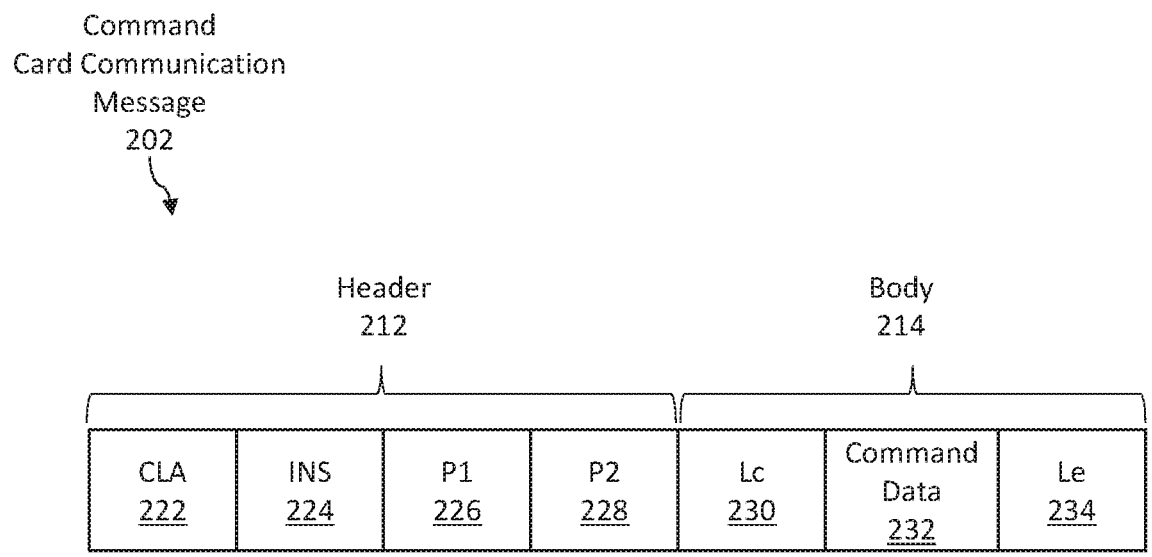
FIG. 2A illustrates an example structure for a card communication message that includes a command, in accordance with one or more embodiments.

FIG. 2A illustrates an example structure for a card communication message that includes a command, in accordance with one or more embodiments. A command card communication message 202 includes a header 212 and, optionally, a body 214.

A header 212 includes the following fields: CLA 222, INS 224, P1 226, and P2 228. Each field may occupy one byte. CLA 222 represents an instruction class of the command. INS 224 represents a specific instruction within an instruction class. P1 226 is a first instruction parameter. P2 228 is a second instruction parameter. P1 226 and/or P2 228 may include a qualifier for INS 224 and/or input data.

A body 214 includes the following fields: Lc 230, Command Data 232, and Le 234. Lc 230 indicates a number of bytes in Command Data 232. Command Data 232 includes data used in relation to the command. Le 234 specifies a maximum number of bytes in the data field of the expected response.

Figure 2B:
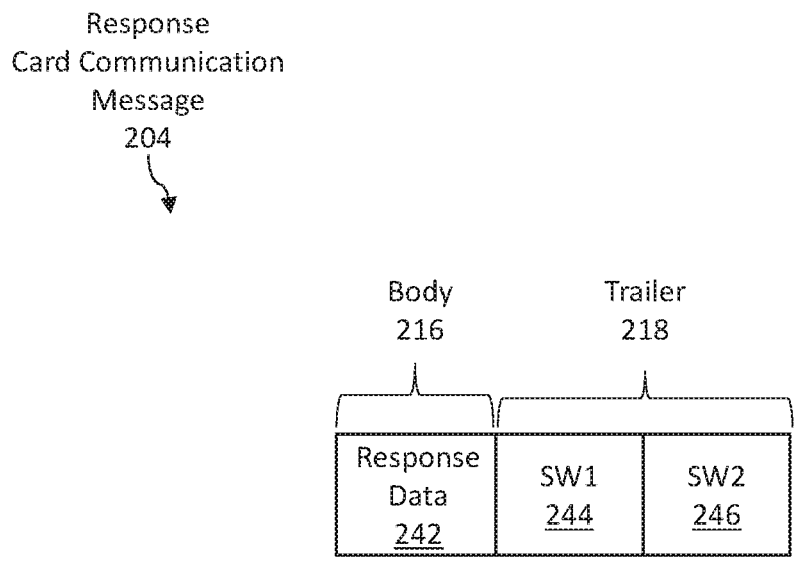
FIG. 2B illustrates an example structure for a card communication message that includes a response to a command, in accordance with one or more environments.

FIG. 2B illustrates an example structure for a card communication message that includes a response to a command, in accordance with one or more environments. A response card communication message 204 includes a trailer 218, and optionally, a body 216.

A trailer 218 includes the following fields: SW1 244 and SW2 246. Each field may occupy one byte. SW1 244 is a first status word. SW2 246 is a second status word. Together SW1 244 and SW2 246 may indicate a status associated with processing a command. A status may be, for example, process completed, or process interrupted. A status may indicate further details, for example, process completed under normal conditions, or process completed with a warning, or process interrupted due to execution error, or process interrupted due to a checking error.

A body 216 includes Response Data 242. Response Data 242 includes data used in relation to the response to a command.

3. Lifecycle of an Applet and Logical Channels

Referring back to FIG. 1, in one or more embodiments, each applet (such as any of applets 104a-b) is uniquely identified by an application identifier (AID). An applet extends an abstract base class (within a card framework and API 106) that defines a generic applet. The abstract base class defines methods used by a card runtime environment 112 to control an applet lifecycle.

An applet lifecycle begins when an applet is downloaded to a card computing device 102. A card runtime environment 112 invokes an install method of the applet. The applet registers itself with the card runtime environment 112 by invoking a register method. Once the applet is installed and registered, the applet is in an Unselected state. While in the Unselected state, the applet is inactive.

A host application 116 may transmit a card communication message including a command to select an applet on a card computing device 102. The command requests the card runtime environment 112 to put the applet into a Selected state. The card runtime environment 112 then invokes a select method of the applet. The applet then becomes active. The applet may perform appropriate initialization in preparation for processing additional card communication messages. The process including the transmission of a card communication message including a command to select an applet, and the invocation of a select method of the applet may be referred to as a "selection process."

Once an applet is selected, a card runtime environment 112 may invoke a process method of the applet. The card runtime environment 112 invokes the process method to pass a card communication message, from a host application 116, to the applet. The applet may then perform various operations to process card communication messages from the host application 116.

A host application 116 may transmit another card communication message including a command to select a new applet on a card computing device 102. A card runtime environment 112 then invokes a deselect method of the active applet. The active applet may perform clean-up logic and return to an inactive, Unselected state. The card runtime environment 112 then invokes a select method of the new applet.

In one or more embodiments, a card computing device 102 supports multiple logical channels. For example, the Java Card Platform Specification 3 supports twenty logical channels. A different applet may be selected on each logical channel. Additionally or alternatively, a particular applet, in multiselectable mode, may be selected on multiple logical channels. Hence, multiple applets may be active on a same card computing device 102 at any given time.

During a selection process for a particular applet, a host application 116 specifies a particular logical channel for the particular applet. The card runtime environment 112 invokes a select method of the particular applet on the particular logical channel. The applet is thus active on the particular channel.

When a command card communication message is received, a card computing device 102 determines whether the command card communication message has logical channel information encoding. If logical channel information is encoded, then the card computing device 102 sends the command card communication message to the respective channel. If logical channel information is not encoded, then the card computing device 102 sends the command card communication message to the basic logical channel (such as, channel 0) of the card computing device 102.

4. Powering Off

In one or more embodiments, a card computing device 102 is powered off. When powered off, the card computing device 102 does not receive power from a CAD 118. When power is reapplied to the card computing device 102, the card runtime environment 112 ensures that:
(a) transient data is reset to a default value;
(b) a transaction in progress, if any, when power was lost (or reset occurred) is aborted;
(c) an applet instance that was active when power was lost (or reset occurred) becomes implicitly deselected (the deselect method need not be called); and/or
(d) If the card runtime environment 112 implements default applet selection, the default applet is selected as the active applet instance for the basic logical channel (such as, channel 0), and the default applet's select method is called. Otherwise, the card runtime environment 112 sets a state to indicate that no applet is active on the basic logical channel.

5. Card Suspension and Resumption System

Figure 3:
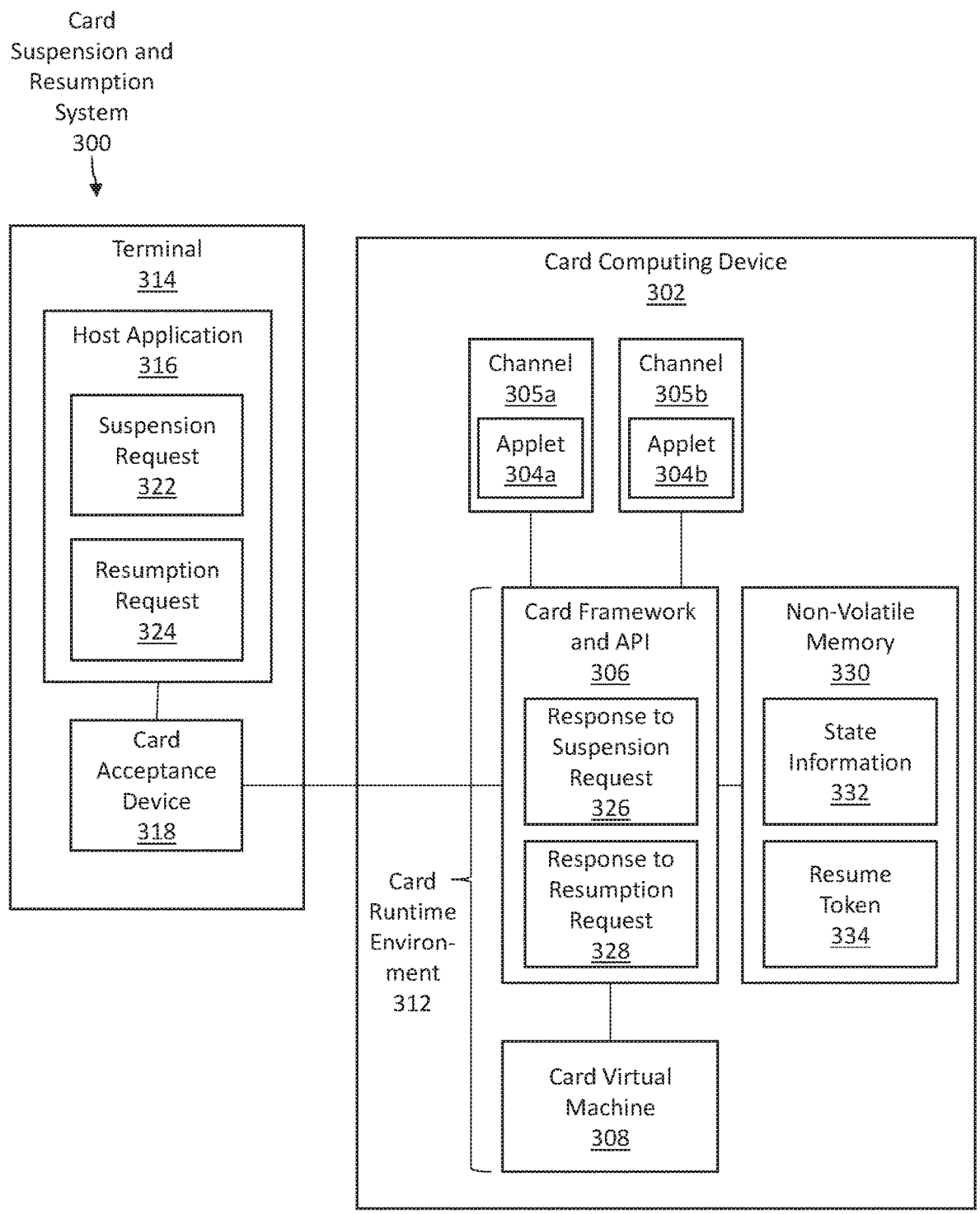
FIG. 3 illustrates an example card suspension and resumption system, in accordance with one or more embodiments.

FIG. 3 illustrates an example card suspension and resumption system, in accordance with one or more embodiments. As illustrated in FIG. 3, a card suspension and resumption system 300 includes a card computing device 302 and a terminal 314. A card computing device 302 includes a card VM 308, a card framework and API 306, non-volatile memory 330, one or more logical channels 305*a-b*, and one or more applets 304*a-b*. A card VM 308 and A card framework and API 306 may be collectively referred to as a "card runtime environment 312." A terminal 314 includes a host application 316 and a CAD 318. In one or more embodiments, the system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component.

In one or more embodiments, one or more components of FIG. 3 are similar to one or more components of FIG. 1, as described above. A card computing device 302 of FIG. 3 is similar to a card computing device 102 of FIG. 1. A card VM 308 of FIG. 3 is similar to a card VM 108 of FIG. 1. A card framework and API 306 of FIG. 3 is similar to a card framework and API 106 of FIG. 1. An applet (such as any of applets 304*a-b*) of FIG. 3 is similar to an applet (such as any of 104*a-b*) of FIG. 1. A terminal 314 of FIG. 3 is similar to a terminal 114 of FIG. 1. A host application 316 of FIG. 3 is similar to a host application 116 of FIG. 1. A CAD 318 of FIG. 3 is similar to a CAD 118 of FIG. 1.

In one or more embodiments, a card computing device 302 is associated with one or more logical channels 305*a-b*. Each logical channel is configured to support one active applet. An applet that is active on a particular logical channel may be referred to as being "active." An applet that is not selected on any logical channel may be referred to as being "inactive." A particular applet may be selected on one or more logical channels. Additional details regarding applet selection and logical channels are described above in Section 3, "Lifecycle of an Applet and Logical Channels."

In one or more embodiments, a card computing device 302 is associated with non-volatile memory 330. Non-volatile memory 330 is any type of computer memory that retains stored information even after having been power cycled (turned off and back on). Non-volatile memory 330 contrasts with volatile memory, which needs constant power in order to prevent data from being erased. Examples of non-volatile memory include read-only memory (ROM), flash memory, ferroelectric random-access memory (RAM), most types of magnetic computer storage devices (such as, hard disk drives, solid state drives, floppy disks, and magnetic tape), and/or optical discs.

Non-volatile memory 330 may include a single storage unit and/or device. Alternatively, non-volatile memory 330 may include multiple different storage units and/or devices.

The multiple different storage units and/or devices may or may not be of the same type or located at the same physical site.

Non-volatile memory 330 may be implemented on a card computing device 302. Additionally or alternatively, non-volatile memory 330 may be implemented on a storage unit and/or device separate from a card computing device 302. The non-volatile memory 330 may be communicatively coupled to the card computing device 302 via a direct connection or via a network.

In one or more embodiments, non-volatile memory 330 is configured to store state information 332 and/or a resume token 334.

In one or more embodiments, state information 332 includes information indicating a state of a card computing device 302 at the time a suspension request 322 is processed. State information 332 is used for restoring a card computing device 302 to the state that the card computing device 302 was in at the time a suspension request 322 is processed. State information 332 includes, for example, which applets are active on which logical channels, processes that are performed or being performed by the applets, authentications that have been completed by the applets, and/or encryption keys that are used by the applets.

In one or more embodiments, a resume token 334 is a set of data used for determining whether to grant a resumption request 324. The set of data may include one or more bytes, characters, digits, and/or other information. At the time a suspension request 322 is processed, a resume token 334 is generated, stored in non-volatile memory 330, and transmitted to a terminal 314. The resume token 334 may be a set of characters that is determined based on a random number generator, a pseudo-random number generator, and/or a hash function. A resumption request 324 is granted, if a resume token included in the resumption request 324 matches the resume token 334 stored in the non-volatile memory 330.

In one or more embodiments, a host application 316 is configured to transmit a suspension request 322 and/or a resumption request 324. A CAD 318 forwards a suspension request 322 and/or a resumption request 324 from the host application 316 to a card framework and API 306. A suspension request 322 is a request and/or a command to suspend a card computing device 302. A resumption request 324 is a request and/or a command to resume a card computing device 302 after the card computing device 302 has been suspended.

In one or more embodiments, a card framework and API 306 is configured to transmit a response 326 to a suspension request 322. Additionally or alternatively, a card framework and API 306 is configured to transmit a response 328 to a resumption request 324. A CAD 318 forwards a response 326 and/or a response 328 from the card framework and API 306 to a host application 316.

In one or more embodiments, a card framework and API 306 refers to hardware and/or software configured to suspend and/or resume a card computing device 302. A card framework and API 306 accepts a suspension request 322 and suspends a card computing device 302. Alternatively, a card framework and API 306 rejects a suspension request 322 and refrains from suspending a card computing device 302. A card framework and API 305 transmits a response 326 indicating whether the suspension request 322 has been accepted or rejected. Examples of operations accepting or rejecting a suspension request 322 for a card computing device 302 are described below with reference to FIGS. 4A-B.

Further, a card framework and API 306 accepts a resumption request 324 and resumes a card computing device 302 that has been suspended. Alternatively, a card framework and API 306 rejects a resumption request 324 and refrains from resuming a card computing device 302. A card framework and API 305 transmits a response 328 indicating whether the resumption request 324 has been accepted or rejected. Examples of operations accepting or rejecting a resumption request 324 for a card computing device 302 are described below with reference to FIG. 5.

6. Processing a Suspension Request for a Card Computing Device

Figure 4A:
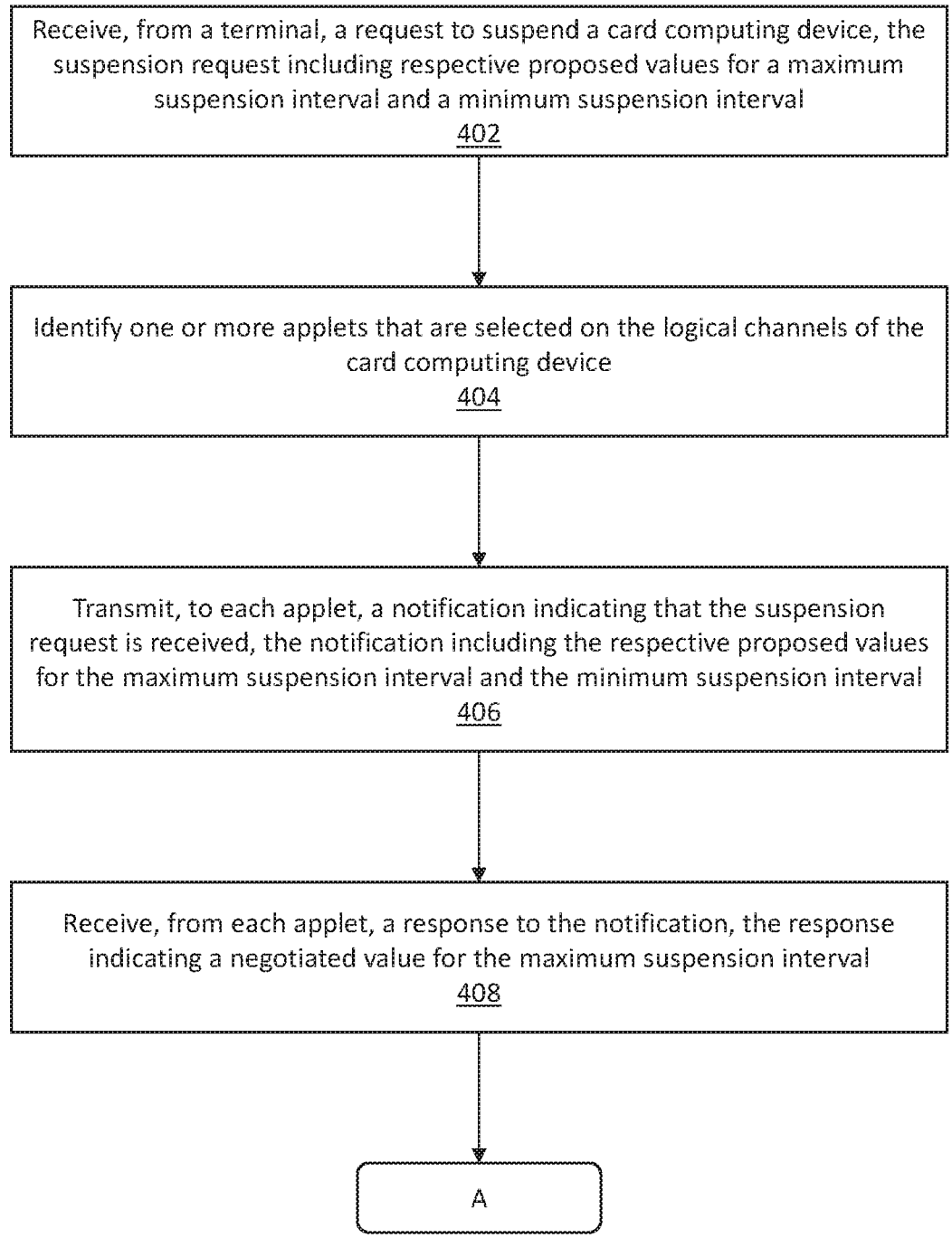
FIGS. 4A-B illustrate an example set of operations for accepting or rejecting a suspension request for a card computing device, in accordance with one or more embodiments.
Figure 4B:
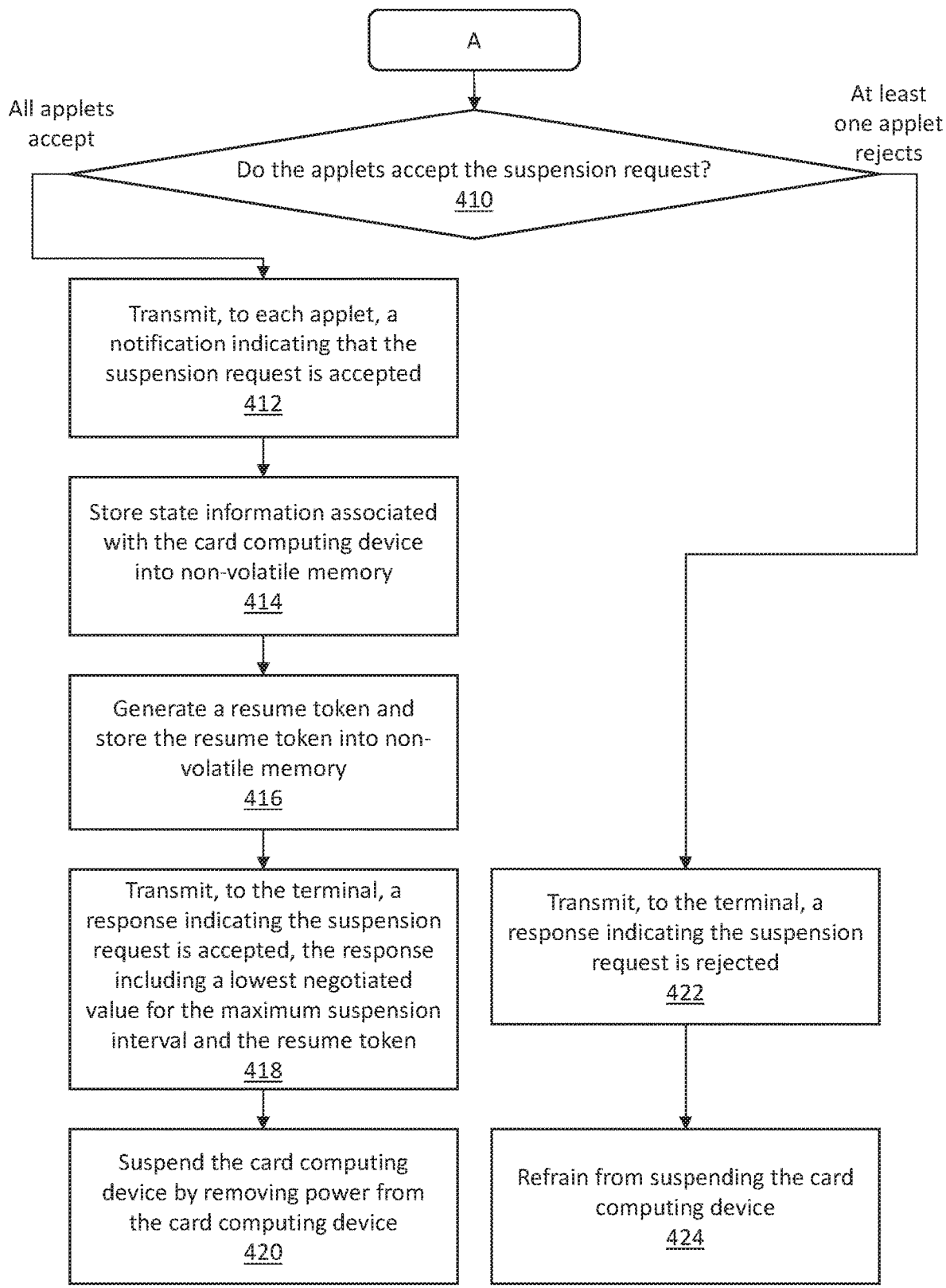

FIGS. 4A-B illustrate an example set of operations for accepting or rejecting a suspension request for a card computing device, in accordance with one or more embodiments. One or more operations illustrated in FIGS. 4A-B may be modified, rearranged, or omitted all together. Accordingly, the particular sequence of operations illustrated in FIGS. 4A-B should not be construed as limiting the scope of one or more embodiments.

One or more embodiments include receiving, from a terminal, a request (also referred to as a "suspension request") to suspend a card computing device, the suspension request including respective proposed values for a maximum suspension interval and a minimum suspension interval (Operation 402). A terminal transmits a suspension request to a card computing device via a CAD. The card computing device receives the suspension request from the terminal via the CAD.

The terminal may transmit the suspension request based on a determination that the card computing device is not needed for a particular duration of time. As an example, a maintenance worker may configure a temperature sensor to transmit temperature data to a back-end monitoring application once per hour. Applets on a card computing device may be configured to (a) perform communications using a particular telecommunications service and (b) authenticate the temperature sensor to the back-end application. Since temperature data is transmitted only once per hour, the applets are not needed for one hour after each transmission. The card computing device is not needed for one hour after each transmission. Hence, after the temperature sensor transmits temperature data to the back-end application, the temperature sensor may transmit a suspension request to the card computing device.

The suspension request includes a proposed value for a maximum suspension interval and another proposed value for a minimum suspension interval. The respective proposed values for the maximum suspension interval and the minimum suspension interval may be set by an owner and/or vendor of the terminal. Additionally or alternatively, the respective proposed values for the maximum suspension interval and the minimum suspension interval may be set by an application of an owner and/or vendor of the terminal (such as, a host application executing on the terminal). The maximum suspension interval and the minimum suspension interval may be indicated as a number of seconds, minutes, hours, days, and/or other time unit.

The maximum suspension interval sets a maximum duration of time, after a card computing device is suspended, during which the card computing device may be resumed from the suspended state. The maximum suspension interval is the maximum duration of time for which the card computing device is to remain suspended. The minimum suspension interval sets a minimum duration of time, after a card computing device is suspended, during which the card computing device cannot be resumed from the suspended date. The minimum suspension interval is the minimum duration of time for which the card computing device is to remain suspended.

If a card computing device is suspended for longer than the maximum suspension interval, or if a card computing device is suspended for shorter than the minimum suspension interval, then the card computing device may be presumptively powered off. Upon reapplying power, initialization procedures and/or selection procedures may need to be performed. Examples of operations associated with powering off a card computing device are described above in Section 4, titled "Powering Off." Hence, resumption of the card computing device from the suspended state may be disallowed. The maximum suspension interval and the minimum suspension interval may be set for security reasons and/or other reasons.

The suspension request may be transmitted in a card communication message. The suspension request may conform to the example structure described above with reference to FIG. 2A. As an example, a new instruction class may be designated for requests associated with suspending and resuming a card computing device. The CLA field may include a value corresponding to the new instruction class. The INS field and/or the P1 field may include a value corresponding to an instruction, within the new instruction class, to suspend the card computing device. The Command Data field may include the respective proposed values for the maximum suspension interval and the minimum suspension interval. The Command Data field may further indicate the time unit (such as, seconds, minutes, hours, or days) in which the proposed values are provided.

One or more embodiments include identifying one or more applets that are selected on the logical channels of the card computing device (Operation 404). The card computing device identifies applets selected on each logical channel. Examples of operations for selecting an applet on a particular channel are described above in Section 3, entitled "Lifecycle of an Applet and Logical Channels."

One or more embodiments include transmitting, to each applet, a notification indicating that the suspension request is received, the notification including the respective proposed values for the maximum suspension interval and the minimum suspension interval (Operation 406). The card computing device transmits to each applet a notification indicating that the suspension request is received. As an example, a card runtime environment of a card computing device invokes a particular method of each applet to notify each applet that suspension has been requested.

One or more embodiments include receiving, from each applet, a response to the notification, the response indicating a negotiated value for the maximum suspension interval (Operation 408). Each applet transmits a response to the notification indicating that the suspension request is received. The card computing device receives the response from each applet.

In an embodiment, an applet's response to the notification indicates whether the applet accepts or rejects the suspension request. The applet determines whether to accept or reject the suspension request based on various criteria, examples of which are described below.

An applet determines whether to accept or reject the suspension request based on the proposed value for the minimum suspension interval. An applet is associated with an applet-specific maximum suspension interval. The applet-specific maximum suspension interval may be set by an owner and/or vendor of the applet. Additionally or alternatively, the applet-specific maximum suspension interval may be set by an application of an owner and/or vendor of the applet. If the applet-specific maximum suspension interval is greater than the proposed value for the minimum suspension interval, then the applet rejects the suspension request. If the applet-specific maximum suspension interval is not greater than the proposed value for the minimum suspension interval, then the applet may accept the suspension request.

An applet determines whether to accept or reject the suspension request based on whether the applet is in the process of communicating with the terminal. If an applet is in the process of communicating with the terminal, then the applet rejects the suspension request. If an applet is not in the process of communicating with the terminal, then the applet may accept the suspension request. Additionally or alternatively, an applet determines whether to accept or reject the suspension request based on whether the applet is in the process of communicating with the terminal using a particular communication mode. If an applet is in the process of communicating with the terminal using the particular communication mode, then the applet rejects the suspension request. If an applet is not in the process of communicating with the terminal using the particular communication mode, then the applet may accept the suspension request.

An applet determines whether to accept or reject the suspension request based on whether the applet is operating in a secure mode. As an example, an applet may operate in a secure mode if the applet is selected on a secure channel. If an applet is operating in a secure mode, then the applet rejects the suspension request. If an applet is not operating in a secure mode, then the applet may accept the suspension request.

In an embodiment, an applet's response indicates a negotiated value for the maximum suspension interval. As described above, an applet is associated with an applet-specific maximum suspension interval. The applet-specific maximum suspension interval is the applet's negotiated value for the maximum suspension interval. Each applet may provide a different negotiated value for the maximum suspension interval.

One or more embodiments include determining whether the applets accept the suspension request (Operation 410). The card computing device determines whether any of the responses from the applets indicate that the suspension request is rejected. Additionally or alternatively, the card computing device determines whether any negotiated value for the maximum suspension interval, returned from an applet, is less than the proposed value for the minimum suspension interval. If any negotiated value for the maximum suspension interval is less than the proposed value for the minimum suspension interval, then the card computing device determines that there is a rejection to the suspension request. If no negotiated value for the maximum suspension interval is less than the proposed value for the minimum suspension interval, then the card computing device may determine that the suspension request is accepted.

If all applets accept the suspension request, then one or more embodiments include transmitting, to each applet, a notification indicating that the suspension request is accepted (Operation 412). The card computing device transmits to each applet a notification indicating that the suspension request is accepted. Each applet may perform a respective set of operations prior to suspension.

One or more embodiments include storing state information associated with the card computing device into non-volatile memory (Operation 414). The card computing device determines a state of the card computing device. The state may include, for example, which applets are selected on which logical channels. The state may include, for example, processes that are performed or being performed by the applets and/or data associated therewith. The state may include, for example, passwords and/or keys used for authenticating and/or encrypting data by one or more applets. The card computing device stores state information indicating the state of the card computing device at the time of suspension. The card computing device stores the state information into non-volatile memory associated with the card computing device.

As an example, a first applet may be configured to perform communications using a particular telecommunications service. A second applet may be configured authenticate a card computing device and/or a terminal to the back-end application.

The first applet may be selected on a first logical channel. The first applet may include authentication information for authenticating the card computing device and/or terminal to the telecommunications service. The telecommunications service may allow or deny a request to communicate based on the authentication information.

The second applet may be selected on a second logical channel. The second applet may perform data processing on the data to be transmitted to the back-end application.

State information associated with the card computing device may indicate: (a) the first applet is selected on the first logical channel, (b) the second applet is selected on the second logical channel, (c) the authentication information of the first applet, (d) the data processed by the second applet, and (e) an address of the instruction currently being processed by the second applet (such as, a program counter (PC) register).

One or more embodiments include generating a resume token and storing the resume token into non-volatile memory (Operation 416). The card computing device generates a resume token. The card computing device may generate the resume token based on a random number generator, a pseudo-random number generator, and/or a hash function. The card computing device stores the resume token into non-volatile memory associated with the card computing device.

One or more embodiments include transmitting, to the terminal, a response indicating the suspension request is accepted, the response including a lowest negotiated value for the maximum suspension interval and the resume token (Operation 418). The card computing device determines a lowest value from the negotiated values included in the responses received from the applets at Operation 408. Additionally, the card computing device determines the resume token, as described above at Operation 416. Then the card computing device generates a response that includes (a) the lowest negotiated value for the maximum suspension interval and (b) the resume token. The response indicates that the suspension request is accepted. The card computing device transmits the response to the terminal via the CAD. The terminal receives the response via the CAD.

The response to the suspension request may be transmitted in a card communication message. The response may confirm to the example structure described above with reference to FIG. 2B. As an example, the Response Data field may include the lowest negotiated value for the maximum suspension interval. The Response Data field may further indicate the time unit (such as, seconds, minutes, hours, or days) in which the lowest negotiated value is provided. The Response Data field may further include the resume token.

Based on the lowest negotiated value for the maximum suspension interval included in the response, the card computing device negotiates a different value for the maximum suspension interval from the proposed value received, from the terminal, at Operation 402. If the lowest negotiated value for the maximum suspension interval is less than the proposed value for the maximum suspension interval, then a valid suspension interval is any interval between (a) the proposed value for the minimum suspension interval received at Operation 402 and (b) the lowest negotiated value for the maximum suspension interval. If the lowest negotiated value for the maximum suspension interval is greater than the proposed value for the maximum suspension interval, then a valid suspension interval is any interval between (a) the proposed value for the minimum suspension interval received at Operation 402 and (b) the proposed value for the maximum suspension interval.

Based on the resume token included in the response, the card computing device provides a key for resuming the state indicated by the stored state information. As described below with reference to FIG. 5, the card computing device allows resumption only if there is a match between (a) a resume token included in a resumption request from the terminal to the card computing device and (b) a resume token stored in non-volatile memory associated with the card computing device.

One or more embodiments include suspending the card computing device by removing power from the card computing device (Operation 420). The card computing device relies on the CAD to supply power. When the card computing device is suspended, the card computing device stops receiving power from the CAD. The power terminals to the CAD may be disabled. Additionally or alternatively, connection to the CAD may be removed and/or deactivated. The card computing device stops performing any operations.

Returning to Operation 410, if at least one applet rejects the suspension request, then one or more embodiments include transmitting, to the terminal, a response indicating the suspension request is rejected (Operation 422). The card computing device transmits a response indicating the suspension request is rejected. The response may optionally indicate a reason for the rejection. The card computing device transmits the response to the terminal via the CAD. The terminal receives the response from the card computing device via the CAD.

One or more embodiments include refraining from suspending the card computing device (Operation 424). The card computing device is not suspended. The card computing device does not perform one or more of the following: (a) storing state information into non-volatile memory; (b) storing a resume token into non-volatile memory; and (c) transmitting a response to the terminal that includes a negotiated value for the maximum suspension interval and/or a resume token.

In an embodiment, power is not removed from the card computing device. The card computing device continues to operate. In an alternative embodiment, power is removed from the card computing device. The card computing device is powered off rather than suspended. Examples of operations associated with powering off a card computing device are described above in Section 4, entitled "Powering Off."

7. Processing a Resumption Request for a Card Computing Device

Figure 5:
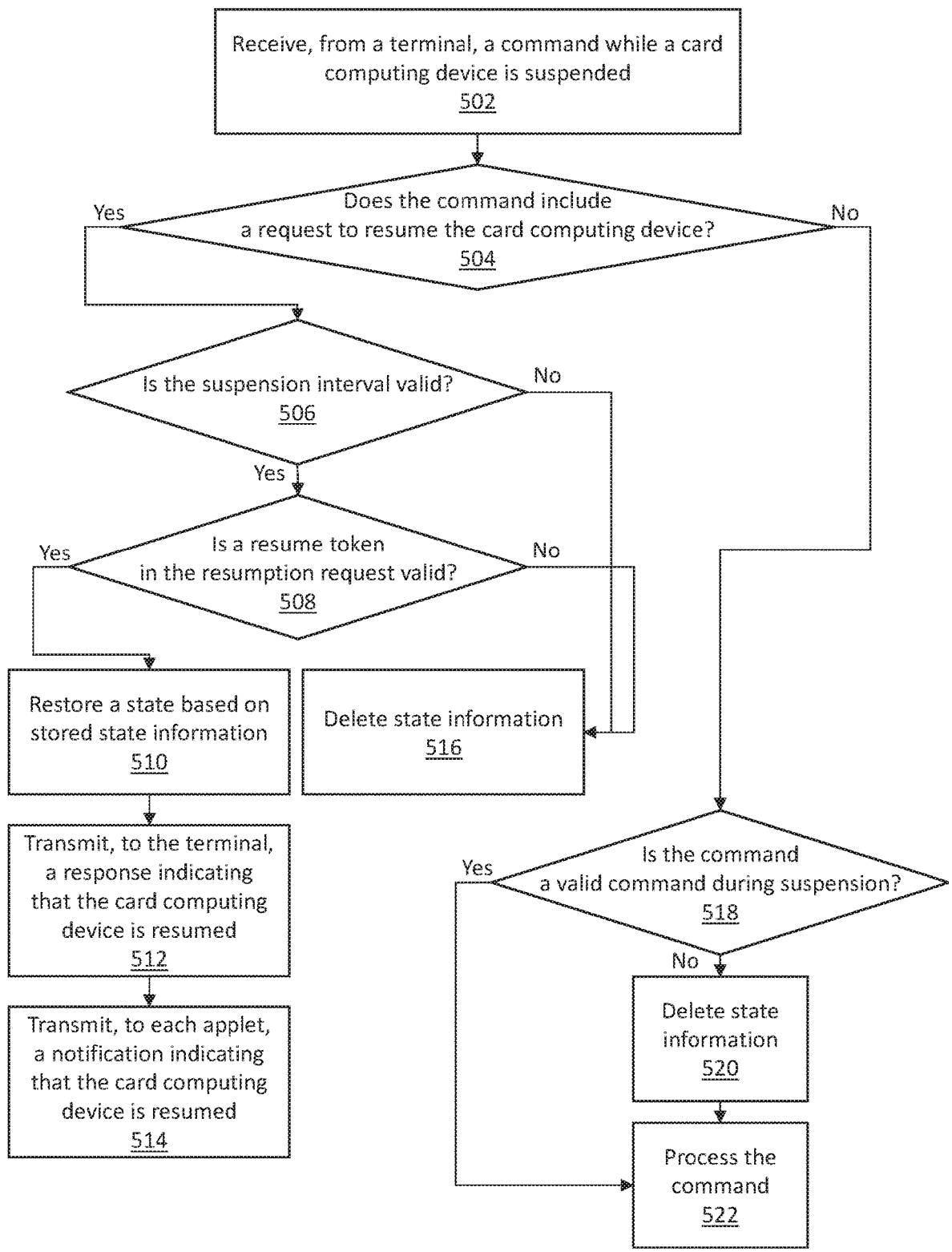
FIG. 5 illustrates an example set of operations for accepting or rejecting a resumption request for a card computing device, in accordance with one or more embodiments.

FIG. 5 illustrates an example set of operations for accepting or rejecting a resumption request for a card computing device, in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments include receiving, from a terminal, a command while a card computing device is suspended (Operation 502). Initially, no power is provided to a card computing device. Non-volatile memory associated with the card computing device stores state information indicating a state of the card computing device when power was removed. Then a terminal transmits a particular command to the card computing device via a CAD. The CAD provides power the card computing device, and forwards the particular command to the card computing device. The particular command is the first command transmitted from the CAD to the card computing device after applying power to the card computing device. The card computing device receives the particular command from the terminal via the CAD.

One or more embodiments include determining whether the command includes a request (also referred to as a "resumption request") to resume the card computing device (Operation 504). The card computing device determines whether the command received at Operation 502 includes a resumption request.

The terminal may transmit a resumption request based on a determination that the card computing device is needed for performing a particular operation. As an example, a maintenance worker may configure a temperature sensor to transmit temperature data to a back-end monitoring application once per hour. Applets on a card computing device may be configured to (a) perform communications using a particular telecommunications service and (b) authenticate the temperature sensor to the back-end application. After the temperature sensor transmits temperature data to the back-end application, the temperature sensor may transmit a suspension request to the card computing device. One hour later, the temperature sensor may need to transmit the current temperature data to the back-end application. The temperature sensor may need the applets to perform communications using the particular telecommunications service and to authenticate the temperature sensor to the back-end application. Hence, the temperature sensor may transmit a resumption request to the card computing device.

The command received at Operation 502 may be transmitted in a card communication message. The command may conform the example structure described above with reference to FIG. 2A. As an example, a new instruction class may be designated for requests associated with suspending and resuming a card computing device. If the command received at Operation 502 includes a resumption request, the CLA field may include a value corresponding to the new instruction class. The INS field and/or the P1 field may include a value corresponding to an instruction, within the new instruction class, to resume the card computing device. The Command Data field may include a resume token. The resume token included in the command received at Operation 502 may be the same as the resume token previously included in the response, to the suspension request, which was transmitted from the card computing device to the terminal at the time of suspension.

If the command includes a resumption request, then one or more embodiments include determining whether the suspension interval is valid (Operation 506). As described above, a valid suspension interval is any interval between (a) the proposed value for the minimum suspension interval received at Operation 402 of FIG. 4 and (b) the lowest negotiated value for the maximum suspension interval included in the response transmitted at Operation 418 of FIG. 4. Alternatively, a valid suspension interval is any interval between (a) the proposed value for the minimum suspension interval received at Operation 402 of FIG. 4 and (b) the proposed value for the maximum suspension interval received at Operation 402 of FIG. 4.

The card computing device determines a duration of time that has passed from the suspension of the card computing device to the receipt of the command at Operation 502. The duration of time is the suspension interval. The card computing device compares the suspension interval to the valid suspension interval. If the suspension interval is greater than the proposed value for the minimum suspension interval received at Operation 402 of FIG. 4, and the suspension interval is less than the lowest negotiated value for the maximum suspension interval included in the response transmitted at Operation 418 of FIG. 4, then the suspension interval is valid. If the suspension interval is less than the proposed value for the minimum suspension interval received at Operation 402 of FIG. 4, or the suspension interval is greater than the lowest negotiated value for the maximum suspension interval included in the response transmitted at Operation 418 of FIG. 4, then the suspension interval is not valid.

One or more embodiments include determining whether a resume token in the resumption request is valid (Operation 508). As described above at Operation 416 of FIG. 4, the card computing device stores a resume token into non-volatile memory at the time of suspension. Responsive to receiving the resumption request, the card computing device retrieves the resume token from the non-volatile memory.

Additionally, the card computing device determines a resume token that is included in the resumption request. The card computing device compares (a) the resume token retrieved from non-volatile memory and (b) the resume token in the resumption request. If the two resume tokens are the same, then the resume token in the resumption request is valid. If the two resume tokens are different, then the resume token in the resumption request is not valid.

If both the suspension interval is valid, and the resume token in the resumption request is valid, then one or more embodiments include restoring a state, associated with the card computing device, based on stored state information (Operation 510). As described above at Operation 414 of FIG. 4, the card computing device stores state information into non-volatile memory at the time of suspension. Responsive to determining that the suspension interval is valid and the resume token in the resumption request is valid, the card computing device retrieves the state information from the non-volatile memory. The card computing device restores the state associated with the card computing device based on the state information.

Based on the state information, the card computing device determines that the applets that were selected on particular logical channels at the time of suspension are now selected on the same logical channels. During resumption, the applets are determined as being selected on the logical channels, without having to go through a selection process. Examples of operations included in a selection process are described above in Section 3, entitled "Lifecycle of an Applet and Logical Channels."

Additionally or alternatively, based on the state information, the card computing device may determine that processes that were interrupted and/or stopped at the time of suspension, and now allow the applets to continue the processes. The card computing device may determine the passwords and/or keys used for authenticating and/or encrypting data at the time of suspension, and now allow the applets to continue using the passwords and/or keys.

One or more embodiments include transmitting, to the terminal, a response indicating that the card computing device is resumed (Operation 512). The card computing device transmits a response indicating that the card computing device is resumed. The card computing device transmits the response to the terminal via the CAD. The terminal receives the response from the card computing device via the CAD.

The response to the resumption request may be transmitted in a card communication message. The response may conform to the example structure described above with reference to FIG. 2B. As an example, the SW1 and SW2 fields may indicate that the card computing device is resumed.

One or more embodiments include transmitting, to each applet, a notification indicating the card computing device is resumed (Operation 512). The card computing device transmits to each applet a notification indicating the card computing device is resumed. The applets may continue using the passwords and/or keys that were used at the time of suspension. The applets may continue processes that were interrupted and/or stopped at the time of suspension.

Returning to Operations 506 and 608, if either the suspension interval is not valid, or the resume token in the resumption request is not valid (or both are not valid), then one or more embodiments include deleting state information (Operation 516). The card computing device deletes the state information that was stored into the non-volatile memory at the time of suspension. Additionally or alternatively, the card computing device marks the state information as being non-usable. Hence, the card computing device is no longer suspended. The card computing device is implicitly powered off. Examples of operations associated with powering off a card computing device are described in Section 4, entitled "Powering Off."

Returning to Operation 504, if the command does not include a resumption request, then one or more embodiments include determining whether the command is a valid command during suspension (Operation 518). The card computing device is configured to validly receive a particular set of commands. As an example, a command to read certain data stored on a card computing device may be valid during suspension. The command may be, for example, a READ BINARY command or a READ RECORD command. As another example, a command that indicates the capabilities of the terminal (such as, whether the terminal supports additional power consumption) may be valid during suspension. The command may be, for example, a TERMINAL CAPABILITY command.

The card computing device determines whether the command received at Operation 502 is with the particular set of commands that are valid during suspension. If the command received at Operation 502 is with the particular set of commands that are valid during suspension, then the command is a valid command during suspension. If the command received at Operation 502 is not with the particular set of commands that are valid during suspension, then the command is not a valid command during suspension.

If the command is not a valid command during suspension, then one or more embodiments include deleting state information (Operation 520). Examples of operations for deleting state information are described above with reference to Operation 516.

One or more embodiments include processing the command (Operation 522). The card computing device processes the command received at Operation 502. The card computing device may fulfill the request included in the command. Additionally or alternatively, the card computing device may return an error message in response to the command.

8. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 6:
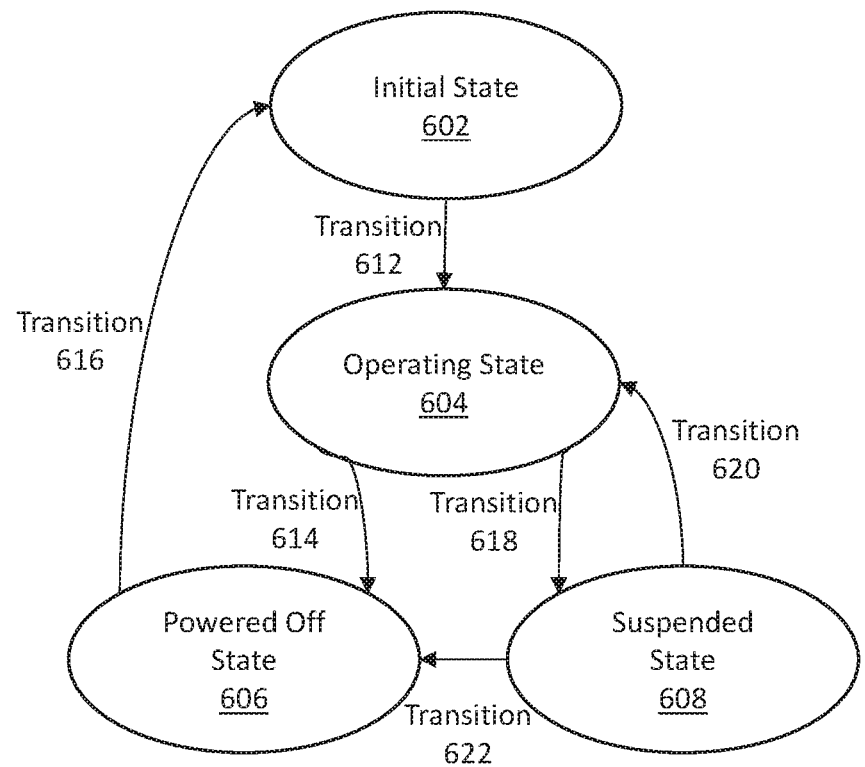
FIG. 6 illustrates an example state machine for a card computing device, in accordance with one or more embodiments.

FIG. 6 illustrates an example state machine for a card computing device, in accordance with one or more embodiments. An example state machine 600 includes the following states: an initial state 602, an operating state 604, a powered off state 606, and a suspended state 608.

In an example, a back-end monitoring application maintains humidity data collected from a basement of building. Humidity sensors are installed in the basement to collect humidity data, and to transmit the humidity data to the back-end application. Each humidity sensor is installed with a battery. If the battery is drained, a user needs to obtain the humidity sensor from the basement and recharge the battery. It is desired that power on the humidity sensor is conserved as much as possible to reduce the need for recharging the battery. A user configures the humidity sensor to transmit humidity data to the back-end application once per month.

On January 1, a humidity sensor is connected with a card computing device via a CAD. The card computing device is powered on. The card computing device enters an initial state 602. In the initial state 602, no applets are selected on any logical channels. The humidity sensor transmits commands to the card computing device to install applets. A first applet is configured to perform communications using a particular telecommunications service. The first applet authenticates the card computing device to the telecommunications service so that the card computing device may access the telecommunications service. A second applet is configured to authenticate the card computing device to the back-end application. The card computing device must be authenticated in order to write humidity data to the back-end application.

The humidity sensor also transmits commands to the card computing device to select applets. The first applet is selected on the first logical channel of the card computing device. The second applet is selected on the second logical channel of the card computing device.

Upon selection of an applet, the card computing device transitions to an operating state 604. The transition from the initial state 602 to the operating state 604 is indicated as transition 612. In the operating state 604, various applets may be selected and/or deselected on the various logical channels. The applets may perform various operations, such as authenticating the card computing device to the telecommunications service, transmitting data via the telecommunications service, authenticating the card computing device to the back-end application, transmitting data to the back-end application.

As stated above, the humidity sensor is configured to transmit humidity data to the back-end application once per month. On the same day, January 1, the humidity sensor executes the applets to transmit humidity data to the back-end application via the telecommunications service. Since the applets need not perform any operations until one month later, the humidity sensor transmits a suspension request to the card computing device. The suspension request indicates that a proposed value for a maximum suspension interval is 40 days. The suspension request indicates that a proposed value for a minimum suspension interval is 5 days.

The card computing device receives the suspension request via the CAD. The card computing device determines that the first applet has been selected on the first logical channel and the second applet has been selected on the second logical channel. The card computing device transmits a notification to each applet, indicating that the suspension request is received.

The first applet determines whether to accept or reject the suspension request. The telecommunications service provider programmed an applet-specific maximum suspension interval for the first applet. The applet-specific maximum suspension interval for the first applet is 35 days. The first applet determines that the applet-specific maximum suspension interval is greater than the proposed value of 5 days for the minimum suspension interval. Hence, the first applet accepts the suspension request. The first applets transmits a response indicating that the first applet accepts the suspension request, and indicating that a negotiated value for the maximum suspension interval is 35 days.

The second applet determines that an applet-specific maximum suspension interval for the second applet is 31 days. The second transmits a response indicating that a negotiated value for the maximum suspension interval is 31 days. The response does not necessarily indicate whether the second applet accepts or rejects the suspension request.

The card computing device receives the responses from the first applet and the second applet. The card computing device determines whether the applets accept the suspension request.

The card computing device determines that the response from the first applet indicates that the first applet accepts the suspension request.

The card computing device determines that the response from the second applet indicates a negotiated value for the maximum suspension interval from the second applet. The card computing device determines that the negotiated value of 31 days is greater than the proposed value of 5 days for the minimum suspension interval. Therefore, the card computing device determines that the second applet accepts the suspension request.

Since all applets accept the suspension request, the card computing device transmits to each applet a notification that the suspension request is accepted. Each applet performs operations in preparation for suspension.

The card computing device determines state information associated with the card computing device. The state information indicates, for example, that the first applet is selected on the first logical channel, the first applet is authenticated with the telecommunications service, a key used by the first applet to encrypt data to be transmitted via the telecommunications service, the second applet is selected on the second logical channel, the second applet is authenticated with the back-end application, and a key used by the second applet to encrypt data to be transmitted to the back-end application. The card computing device stores the state information into non-volatile memory associated with the card computing device.

The card computing device generates a resume token. The card computing device stores the resume token into non-volatile memory associated with the card computing device.

The card computing device determines a lowest negotiated value for the maximum suspension interval. The negotiated value from the first applet is 35 days. The negotiated value from the second applet is 31 days. Hence, the lowest negotiated value is 31 days.

The card computing device transmits to the terminal a response indicating that the suspension request is accepted. The response indicates the lowest negotiated value for the maximum suspension interval is 31 days. The response also includes the resume token.

The card computing device then enters a suspended state 608. In the suspended state 608, no power is applied to the card computing device. Hence power of the humidity sensor is conserved. The transition from the operating state 604 to the suspended state 608 is indicated as transition 618.

On February 1, the humidity sensor is scheduled to transmit humidity data to the back-end application. The humidity sensor powers on the card computing device, and transmits a resumption request to the card computing device. The card computing device determines that a resumption request is received.

The card computing device determines that 31 days has passed since the card computing device entered the suspended state 608. The card computing device determines whether the suspension interval of 31 days is valid. The card computing device determines that a valid suspension interval is between 5 days and 31 days. Hence, the suspension interval of 31 days is valid.

The card computing device identifies a resume token included in the resumption request. The resume token included in the resumption request was received by the humidity sensor at the time of suspension on January 1. The card computing device retrieves a resume token from non-volatile memory associated with the card computing device. The card computing device determines that the two resume tokens are the same. Hence, the card computing device determines that the resume token in the resumption request is valid.

The card computing device retrieves state information from non-volatile memory associated with the card computing device. The card computing device restores a state based on the state information. Restoring the state includes, for example, determining that the first applet is selected on the first logical channel, determining that the first applet is authenticated with the telecommunications service, determining a key used by the first applet to encrypt data to be transmitted via the telecommunications service, determining that the second applet is selected on the second logical channel, determining that the second applet is authenticated with the back-end application, and determining a key used by the second applet to encrypt data to be transmitted to the back-end application. The applets are determined as being selected on the respective logical channels without performing any selection process after the resumption request is received. The applets are determined as being authenticated without performing any authentication process with the telecommunications service and/or the back-end application after the resumption request is received. The keys for the applets are determined without performing any authentication process with the telecommunications service and/or the back-end application after the resumption request is received. The card computing device re-enters the operating state 604. The operating state 604 immediately after resumption is the same as the operating state 604 at the time of suspension. The transition from the suspended state 608 to the operating state 604 is indicated as transition 620.

The card computing device transmits to the humidity sensor a response indicating that the card computing device is resumed. The card computing device transmits to each applet a notification indicating that the card computing device is resumed.

On the same day, February 1, the humidity sensor executes the applets to transmit humidity data to the back-end application via the telecommunications service. Since the applets need not perform any operations until one month later, the humidity sensor transmits a suspension request to the card computing device.

The card computing device processes the suspension request as described above. The card computing device stores state information into the non-volatile memory. The card computing device stores a resume token into the non-volatile memory. The resume token generated on February 1 may be the same as or different from the resume token generated on January 1. The card computing device enters the suspended state 608 again.

Between February 2 and February 28, an attacker tampers with the humidity sensor. The attacker ejects the card computing device from the humidity sensor and inserts the card computing device into an attacker device.

On March 1, the attacker device powers on the card computing device, and transmits a resumption request to the card computing device. The card computing device determines that a resumption request is received.

The card computing device determines that 28 days has passed since the card computing device entered the suspended state 608. The card computing device determines whether the suspension interval of 28 days is valid. The card computing device determines that a valid suspension interval is between 5 days and 31 days. Hence, the suspension interval of 28 days is valid.

The card computing device identifies a resume token included in the resumption request. The resume token included in the resumption request is determined by the attacker device. The card computing device retrieves a resume token from non-volatile memory associated with the card computing device. The card computing device determines that the two resume tokens are different. The attacker device did not determine the resume token that is stored in the non-volatile memory associated with the card computing device.

Responsive to determining that the resume token in the resumption token is not valid, the card computing device deletes the state information from the non-volatile memory. The card computing device enters a powered off state 606. The transition from the suspended state 608 to the powered off state 606 is indicated as transition 622.

On March 2, a user discovers that the humidity sensor was tampered with. The user inserts the card computing device back into a valid humidity sensor. The humidity sensor powers on the card computing device. There is no state information stored on the card computing device. The card computing device enters the initial state 602. The transition from the powered off state 606 to the initial state 602 is indicated as transition 616.

In the initial state 602, no applets are selected. The first applet and the second applet may remain installed on the card computing device, but the first applet and the second applet are not selected on any logical channel. Any processes being performed by the first applet and the second applet at the time of suspension are determined as aborted. The first applet and the second applet are not authenticated.

A selection process is executed to select the first applet on the first logical channel. A selection process is executed to select the second applet on the second logical channel. The humidity sensor executes the first applet and the second applet to transmit humidity data to the back-end application via the telecommunications service. The card computing device enters the operating state 604.

After a year of operation, the battery of the humidity sensor may be drained. While in the operating state 604, the card computing device loses power. The card computing device enters the powered off state 606. The transition from the operating state 604 to the powered off state 606 is indicated as transition 614.

The battery of the humidity sensor is recharged. The humidity sensor powers on the card computing device. There is no state information stored on the card computing device. The card computing device enters the initial state 602. In the initial state 602, no applets are selected.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
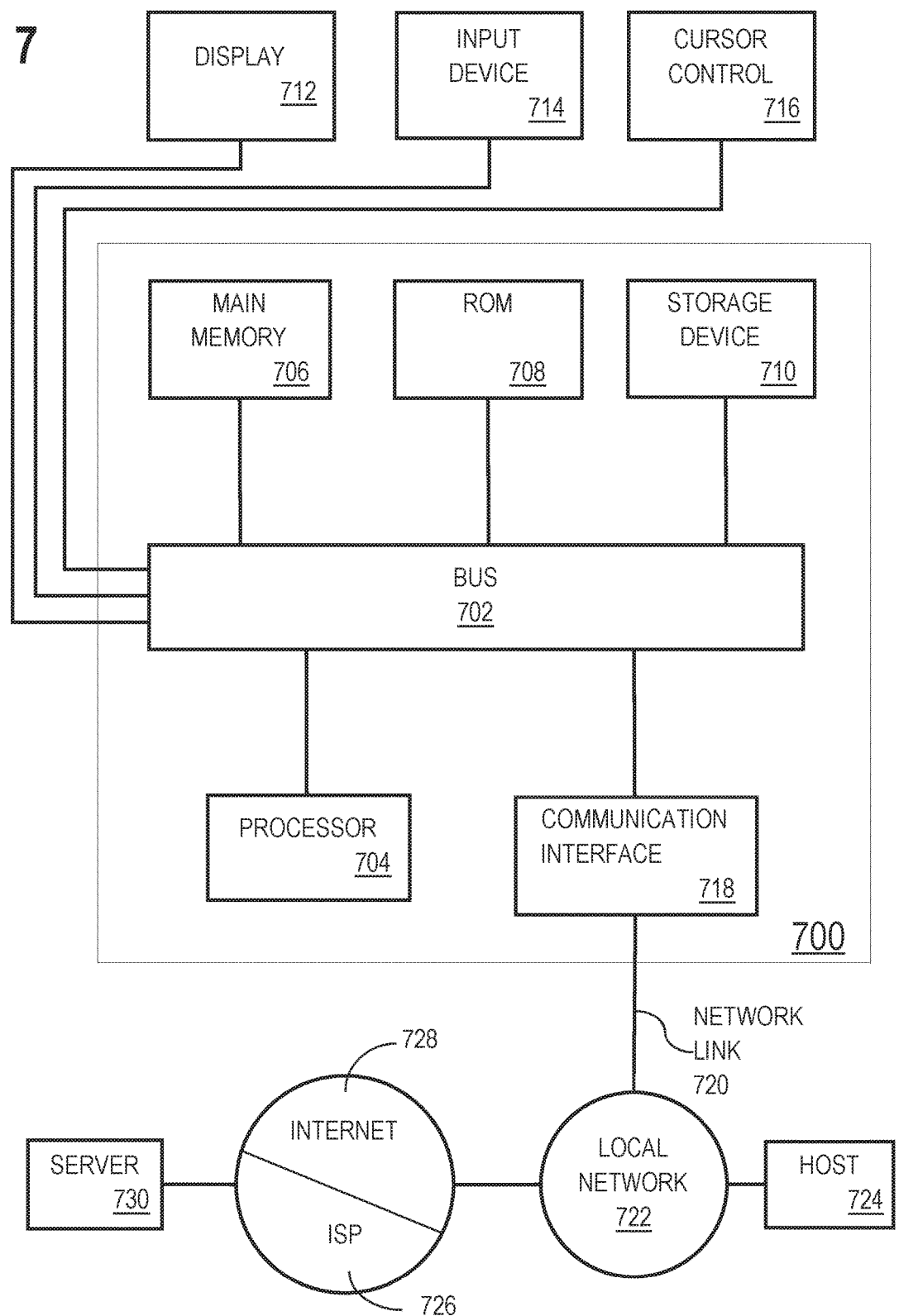
FIG. 7 is a block diagram that illustrates a computer system, in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
receiving, from a terminal, a request to suspend a card computing device, the request to suspend including a proposed value for a suspension interval;
transmitting, to an applet executing on the card computing device, a notification indicating the request to suspend is received;
receiving, from the applet, a response to the notification, the response to the notification comprising a negotiated value for the suspension interval;
storing state information associated with the card computing device into non-volatile memory associated with the card computing device;
suspending the card computing device by removing power from the card computing device;
receiving, from the terminal, a request to resume the card computing device;
determining a current suspension interval based on a first time associated with the request to resume and a second time associated with suspending the card computing device;
determining whether the current suspension interval is valid based on at least one of the proposed value for the suspension interval and the negotiated value for the suspension interval;
performing one of:
responsive to determining that the current suspension interval is valid based on at least one of the proposed value for the suspension interval and the negotiated value for the suspension interval: resuming a state based on the state information stored in the non-volatile memory;
responsive to determining that the current suspension interval is not valid based on at least one of the proposed value for the suspension interval and the negotiated value for the suspension interval: refraining from resuming the state based on the state information stored in the non-volatile memory.

2. The medium of claim 1, wherein:
the proposed value for the suspension interval indicates a minimum duration of time for which the card computing device is to remain suspended.

3. The medium of claim 1, wherein resuming the state based on the state information stored in the non-volatile memory comprises determining that the applet is selected on a particular logical channel without executing a selection process for the applet.

4. The medium of claim 1, wherein determining the current suspension interval is valid based on at least one of the proposed value for the suspension interval and the negotiated value for the suspension interval comprises:
determining that the current suspension interval is greater than at least one of the proposed value for the suspension interval and the negotiated value for the suspension interval.

5. The medium of claim 1, wherein the operations further comprise:
further responsive to determining that the current suspension interval is not valid based on at least one of the proposed value for the suspension interval and the negotiated value for the suspension interval:
deleting the state information from the non-volatile memory.

6. The medium of claim 1, wherein the operations further comprise:
determining a maximum duration of time for which the card computing device is to remain suspended as a lesser of (a) the proposed value for the suspension interval and (b) the negotiated value for the suspension interval.

7. The medium of claim 1, wherein the operations further comprise:
transmitting, to each of a plurality of applets executing on the card computing device, a respective notification indicating the request to suspend is received, the plurality of applets including the applet;
receiving, from each of the plurality of applets, a respective response to the notification comprising a respective negotiated value for the suspension interval;
determining a maximum duration of time for which the card computing device is to remain suspended as a lowest value from (a) the proposed value for the suspension interval and (b) the negotiated values for the suspension interval.

8. The medium of claim 1, wherein
determining the current suspension interval is valid based on at least one of the proposed value for the suspension interval and the negotiated value for the suspension interval comprises:
determining a maximum duration of time for which the card computing device is to remain suspended based on at least one of the proposed value for the suspension interval and the negotiated value for the suspension interval;
determining that the current suspension interval is less than the maximum duration of time for which the card computing device is to remain suspended.

9. The medium of claim 1, wherein the operations further comprise:
identifying a first value for the resume token indicated by the request to resume;
determining whether the first value for the resume token matches a second value for the resume token that is stored in the non-volatile memory associated with the card computing device;
resuming the state based on the state information stored in the non-volatile memory is further responsive to determining that the first value for the resume token matches the second value for the resume token.

10. The medium of claim 1, wherein the state information indicates a particular logical channel on which the applet is selected.

11. The medium of claim 1, wherein the state information indicates that the applet is authenticated with a particular application.

12. The medium of claim 1, wherein the state information includes a key used by the applet to perform data encryption.

13. A system, comprising:
at least one device including a hardware processor; and
the system being configured to perform operations comprising:
receiving, from a terminal, a request to suspend a card computing device, the request to suspend including a proposed value for a suspension interval;

transmitting, to an applet executing on the card computing device, a notification indicating the request to suspend is received;
receiving, from the applet, a response to the notification, the response to the notification comprising a negotiated value for the suspension interval;
storing state information associated with the card computing device into non-volatile memory associated with the card computing device;
suspending the card computing device by removing power from the card computing device;
receiving, from the terminal, a request to resume the card computing device;
determining a current suspension interval based on a first time associated with the request to resume and a second time associated with suspending the card computing device;
determining whether the current suspension interval is valid based on at least one of the proposed value for the suspension interval and the negotiated value for the suspension interval;
performing one of:
   responsive to determining that the current suspension interval is valid based on at least one of the proposed value for the suspension interval and the negotiated value for the suspension interval: resuming a state based on the state information stored in the non-volatile memory;
   responsive to determining that the current suspension interval is not valid based on at least one of the proposed value for the suspension interval and the negotiated value for the suspension interval: refraining from resuming the state based on the state information stored in the non-volatile memory.

14. The system of claim 13, wherein:
the proposed value for the suspension interval indicates a minimum duration of time for which the card computing device is to remain suspended.

15. A non-transitory computer readable medium comprising instructions which, when executed by one or more hardware processors, cause performance of operations comprising:
invoking a selection method to select an applet on a particular logical channel of a plurality of logical channels associated with a card computing device;
receiving, from a terminal, a request to suspend the card computing device;
storing state information associated with the card computing device into non-volatile memory associated with the card computing device, wherein the state information specifies that the applet has been selected on the particular logical channel;
suspending the card computing device by removing power from the card computing device;
receiving, from the terminal, a request to resume the card computing device;
obtaining the state information from the non-volatile memory associated with the card computing device;
responsive to determining the state information specifies that the applet has been selected on the particular logical channel: executing the applet on the particular logical channel without invoking the selection method for the applet.

16. The medium of claim 15, wherein the applet is not deselected from the particular logical channel in response to the request to suspend.

17. The medium of claim 15, wherein the operations further comprise:
prior to receiving the request to suspend:
   invoking the selection method to select a second applet on a second logical channel of the plurality of logical channels associated with the card computing device;
subsequent to receiving the request to resume:
   responsive to determining the state information specifies that a second applet has been selected on a second logical channel of the plurality of logical channels: executing the second applet on the second logical channel without invoking the selection method for the second applet.

18. The medium of claim 15, wherein the selection method triggers an initialization process on the applet.

19. The medium of claim 15, wherein the selection method is associated with a parameter that specifies the particular logical channel selected for the applet.

20. The medium of claim 15, wherein the operations further comprise:
receiving, from the terminal, a card communication message including logical channel information that indicates an instruction is for the applet on the particular logical channel;
transmitting the instruction to the applet on the particular logical channel.

* * * * *

UNITED STATES PATENT AND TRADEMARK OFFICE
CERTIFICATE OF CORRECTION

PATENT NO. : 10,671,407 B2  
APPLICATION NO. : 16/002936  
DATED : June 2, 2020  
INVENTOR(S) : Hans et al.

Page 1 of 1

It is certified that error appears in the above-identified patent and that said Letters Patent is hereby corrected as shown below:

In the Specification

In Column 1, Line 3, delete "BACKGROUND" and insert -- TECHNICAL FIELD --, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*